US012589430B2

(12) United States Patent
Knauf et al.

(10) Patent No.: US 12,589,430 B2
(45) Date of Patent: Mar. 31, 2026

(54) METHOD FOR AUTOMATED PASS SCHEDULE CALCULATION IN FORGING STEPPED SHAFTS

(71) Applicant: SMS group GmbH, Düsseldorf (DE)

(72) Inventors: Frederik Knauf, Nideggen-Abenden (DE); Martin Wolfgarten, Aachen (DE)

(73) Assignee: SMS group GmbH, Düsseldorf (DE)

( * ) Notice: Subject to any disclaimer, the term of this patent is extended or adjusted under 35 U.S.C. 154(b) by 367 days.

(21) Appl. No.: 18/233,445

(22) Filed: Aug. 14, 2023

(65) Prior Publication Data

US 2024/0051015 A1 Feb. 15, 2024

(30) Foreign Application Priority Data

Aug. 15, 2022 (DE) ..................... 10 2022 208 463.2

(51) Int. Cl.
B21J 9/20 (2006.01)
B21J 5/06 (2006.01)
(Continued)

(52) U.S. Cl.
CPC . B21J 9/20 (2013.01); B21J 5/06 (2013.01); B21J 9/022 (2013.01); G05B 13/00 (2013.01)

(58) Field of Classification Search
CPC ..... B21J 5/022; B21J 7/18; B21J 9/20; G05B 13/00

(Continued)

(56) References Cited

U.S. PATENT DOCUMENTS 4,593,547 A * 6/1986 Heiberger ............. B30B 15/281
72/17.2
6,233,500 B1 * 5/2001 Malas ..................... C22F 1/183
72/364
(Continued)

FOREIGN PATENT DOCUMENTS

CN 109622849 A 4/2019
CN 109622849 B * 4/2021 ............... B21J 7/16
(Continued)

OTHER PUBLICATIONS

SMX Radial forging machines; All-round pioneers, by SMS group; P-319E; Published on Jul. 14, 2017 ; 20 pages.*

(Continued)

*Primary Examiner* — Ronald D Hartman, Jr.
(74) *Attorney, Agent, or Firm* — Smartpat PLC

(57) ABSTRACT

A method for automatic pass schedule calculation during forging, in particular radial forging, of stepped shafts made of metal workpieces, in particular steel, in a forging machine, preferably a radial forging machine with at least four forging tools arranged around the circumference of the workpiece, which are set up and adapted for simultaneous forging the workpiece and/or the stepped shaft, includes: entering starting parameters for the forging process, preferably radial forging process, into a pass schedule calculation program; specifying target parameters for the forging process, preferably radial forging process; and calculating, by the pass schedule calculation program, based on these start and target parameters, a pass plan or calculated a forge sequence. A control and/or regulation unit and a forging machine for carrying out the method are disclosed.

12 Claims, 5 Drawing Sheets

(51) Int. Cl.
　　　*B21J 9/02*　　　　(2006.01)
　　　*G05B 13/00*　　　　(2006.01)

(58) Field of Classification Search
　　　USPC ........................................................ 700/145
　　　See application file for complete search history.

(56) References Cited

U.S. PATENT DOCUMENTS

| | | | | |
|---|---|---|---|---|
| 2005/0247092 | A1* | 11/2005 | Kirchhoff | ............... B21C 51/00 |
| | | | | 72/16.7 |
| 2009/0241629 | A1* | 10/2009 | Chilson | ...................... B21J 5/08 |
| | | | | 72/364 |
| 2013/0118653 | A1* | 5/2013 | Bryan | ...................... B21J 1/025 |
| | | | | 148/567 |
| 2013/0247642 | A1* | 9/2013 | Lazorkin | .................. B21J 13/02 |
| | | | | 72/360 |

FOREIGN PATENT DOCUMENTS

| | | | |
|---|---|---|---|
| DE | 3934236 | A1 | 4/1990 |
| DE | 102005014221 | A1 | 10/2006 |

OTHER PUBLICATIONS

Knauf et al., co-pending U.S. Appl. No. 18/233,429, filed Aug. 14, 2023.
Knauf et al., co-pending U.S. Appl. No. 18/233,437, filed Aug. 14, 2023.
SMS group, SMX Radial forging machines. All-round pioneers. Published on Nov. 1, 2021—Printed in Germany.

\* cited by examiner

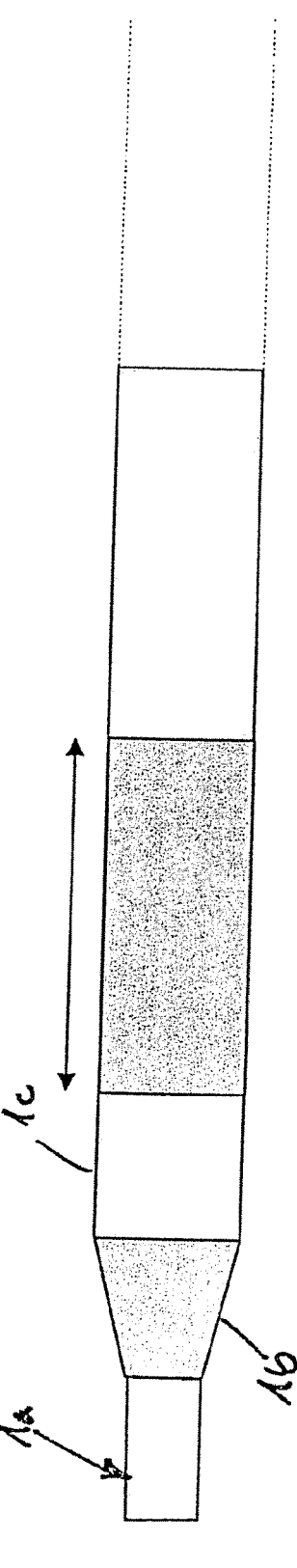

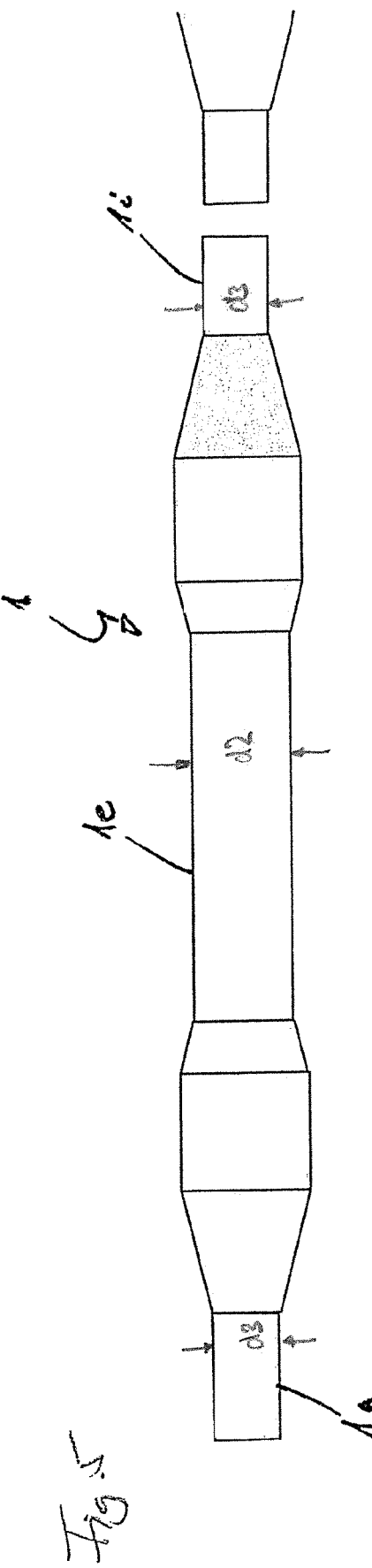

METHOD FOR AUTOMATED PASS SCHEDULE CALCULATION IN FORGING STEPPED SHAFTS

CROSS-REFERENCE TO RELATED APPLICATION

This application claims the benefit of German Patent Application DE 10 2022 208 463.2, filed on Aug. 15, 2022, the contents of which is incorporated by reference in its entirety.

TECHNICAL FIELD

The disclosure relates to a method for automated pass schedule calculation in the forging of stepped shafts made of metal workpieces, in particular steel, in a forging machine, preferably a radial forging machine with at least 4 forging tools arranged around the circumference of the workpiece, which are set up and adapted to simultaneously carry out the forging operation over at least a partial length of the workpiece and/or the stepped shaft.

BACKGROUND

Automated pass schedule calculation for open die forging presses and radial forging machines is generally known. Currently available software that calculates the geometric parameters, such as the diameter and length of the workpiece to be formed, as well as an average temperature of the workpiece throughout the forging process, is commercially available under the brand names ForgeBase® and COMFORGE®, for example. This software enables the plant operator to enter an initial geometry and an end geometry in an input screen. Based thereon, the pass schedule is calculated by the software according to defined parameters. In other words, the software calculates how many forging passes it will take to reach the final geometry and what cross-section reduction is achieved per forging pass. The degree of stretching then results from the individual deformations. In addition, the temperature and required press force are estimated after a forge pass. However, the software is only able to calculate simple geometries such as forging bar steel.

SUMMARY

The present disclosure is based on a desire to further develop pass schedule calculation programs so that they can be used for complex geometries of stepped shafts, for example railway axles. The disclosure further optimizes the forging results known from previous processes and to expand the parameters taken into account during forging.

These objects are achieved with a method as disclosed herein, a control and/or regulation unit of a forging machine as disclosed herein, and with a forging machine as disclosed herein.

The method is provided for automated pass schedule calculation in the radial forging of stepped shafts made of metal workpieces, in particular steel, in a forging machine, preferably a radial forging machine with at least 4 forging tools arranged around the circumference of the workpiece, which are set up and adapted to simultaneously carry out the forging operation at least over a partial length of the workpiece and/or the stepped shaft. For that purpose, start parameters for the forging process are entered into a pass schedule calculation program and target parameters for the forging process are defined. The pass schedule calculation program calculates a pass schedule or a forging sequence based on these start and target parameters. For the first time, it is possible to use a pass schedule calculation program for stepped shafts, which improves the degree of automation of the forging process and the reproducibility of the forging result.

In addition to the tool geometry and the maximum possible pressing force, the pass schedule calculation program preferably takes into account the temperature variation and the temperature distribution over the cross section of the stepped shaft and the change in shape during forging.

By calculating the temperature distribution and the deformation distribution over the component cross section the forging result overall is optimized. The described solution is basically possible using a combination of pass schedule calculation software and the finite element method, with the pass schedule calculation software determining a pass schedule, which is then mapped using the finite element method. As a result of the finite element method, the temperature distribution and deformation distribution over the cross section of the product to be formed can be detected. However, since the calculation of the temperature distribution and deformation distribution using the finite element method is time consuming, expensive and requires technologically trained personnel to use the FEM and evaluate the results, the calculation of the temperature distribution of the deformation distribution over the component cross-section is preferably carried out using the pass schedule calculation program. With such a calculation, a statement about the quality of the forging depending on the calculated pass schedule can be made in a very simple and fast way prior to forging, which also results in the possibility of forming more complex geometries than simple steel bars. This capability specifically facilitates the secure and dependable forging of stepped shafts, such as railway axles.

Particularly in the case of geometries that deviate from bar steel, the material flow during forging, especially in the area of the shoulders to be forged in a stepped shaft, is of particular importance for the local deformation and thus temperature distribution and deformation distribution over the component cross-section. The method preferably takes these parameters into account when calculating the pass schedule and particularly preferably offers a forging result which is optimized for the respectively desired end geometry and which can particularly preferably be achieved automatically and reproducibly.

The pass schedule is preferably calculated taking into account several influencing parameters such as the tool geometry, the maximum possible pressing force, the feed of the workpiece, the workpiece properties such as the flow curve of the material, etc. When calculating the pass schedule, all of these parameters are preferably taken into account in such a way that all constraints, such as the maximum pressing force, are observed. Furthermore, the process of calculating the pass schedule is directed towards reducing material waste or scrap, which includes material that cannot be utilized for the final railway axle. For example, the ends that are correspondingly cut to length and cut off by means of a cutting device constitute waste in the case of a railway axle.

With shafts that are stepped on the inside—an cover shape in which two outer thicker shoulders merge into a thinner cover part—the main challenge is that the tolerances between the two shoulders, i.e. the area that is stepped on the inside, are maintained as precisely as possible. The calculation takes into account, among other things, the proportionate material flow in the area of the tool contact surface in the positive and negative longitudinal direction. It should be noted in particular that the tool contact surface is characterized on the one hand by an area running parallel to the longitudinal direction of the workpiece and on the other hand by an inclined area, thus at an angle to the longitudinal direction of the workpiece. Compared to conventional forging, in particular radial forging, these forging operations result in a calculation that has to take into account significantly more influencing factors than is the case with forging of bar steel and similarly simple geometries.

Finally, in a preferred embodiment of the invention, when calculating the pass schedule, it is always taken into account that heat generated by forming work leads to heating of the workpiece, which must be taken into account with different materials, especially if threshold values for microstructural deformations or the like may be exceeded. The process sequence should therefore preferably be adapted to different materials.

In a preferred embodiment of the method, the pass schedule calculation program takes into account an optimized deformation distribution, particularly preferably within a previously specified temperature range. This provides a method that takes into account the locally different deformation distribution and the forming work associated with it during forging, particularly in the case of radial forging of complex workpiece geometries to form stepped shafts. Ideally, a stepped shaft is achieved that is forged over its entire length and cross section and at the same time does not have any area that has exceeded predetermined and material-dependent threshold values for temperature due to increased forming work. A stepped shaft is thus obtained which has a microstructure which is optimized over its length and cross-section and, associated therewith, has optimized workpiece properties.

In this context, it is particularly preferred if the pass schedule calculation program takes into account the optimized deformation distribution and the temperature variation and temperature distribution after each pass. This provides a method that also takes into account intermediate steps in the forming of the workpiece into a stepped shaft and ensures that predetermined threshold values with regard to the system and process parameters are not exceeded at any time during the forging process, preferably the radial forging process.

In a further embodiment of the invention, it is preferred if the starting parameters, which are entered into a pass schedule calculation program, include the starting geometry of the workpiece, its dimensions, its starting temperature, in particular the furnace temperature at which the workpiece was removed before the start of the forging process, and the material of the workpiece.

In addition, It is preferred if the target parameters that are specified for the forging process, in particular the radial forging process, and entered into the pass schedule calculation program are the target geometry of the long product, its final dimensions, and a shape change that is as homogeneous as possible. The deformation distribution over the cross section of the stepped shaft and/or the temperature distribution over the cross section of the stepped shaft are then the result of forging process. In this way, a method is made available which, with regard to the forging process, knows all the parameters required for optimal use of the pass schedule calculation program and takes them into account when calculating the pass schedule.

In this context, it is particularly preferred if an optimized deformation distribution, in particular over the individual steps of the forging process, is calculated by the pass schedule calculation program based on the target parameters of temperature variation and temperature distribution, or that the temperature variation and temperature distribution, in particular over the individual steps of the forging process, are calculated based on target parameters of an optimized deformation distribution. The method thus uses either the temperature variation and temperature distribution to optimize the deformation distribution, or the deformation distribution to optimize the temperature variation and temperature distribution, in particular over the individual steps of the forging process, and thus optimizes the pass schedule calculation program and finally the forging result itself.

It is also particularly preferred if an optimized microstructure or an optimized microstructure distribution is calculated by the pass schedule calculation program based on the target parameters of temperature variation and temperature distribution. As an alternative to this, in an equally preferred embodiment, the temperature variation and temperature distribution can be calculated using the microstructure as target parameters. In any case, a stepped shaft is obtained by forging, in particular by radial forging, which preferably has a predetermined microstructure or a predetermined microstructure distribution in each component cross section.

In this context, it is also preferred if the pass schedule calculation program takes into account the heat of forming introduced into the workpiece by the forming work during forging, preferably radial forging. The reduction in cross section introduces significant energy into the workpiece and this energy is reflected not only in the resulting change in shape, but also in a clearly measurable increase in the temperature of the workpiece. This increase in the workpiece temperature is often significantly different locally in the case of different forming work that affects the workpiece and thus also has a locally significant influence on the existing or developing microstructure. Taking into account the forming heat introduced into the workpiece thus supports the method in achieving an optimal forging result.

In addition, it is particularly preferred if the method employs an online connection to a press control unit and can output optimized control commands during the forging process, preferably the radial forging process, on the basis of measured values and/or calculated values. A control of the method designed in this way uses either suitable measurement results, in particular measured surface temperatures, or where measurements cannot be taken or would be difficult to take, calculated values for regular and ideally permanent online control of the forging process. This supports the goal of an optimized method for automated pass schedule calculation in the forging of stepped shafts made of metal workpieces in a particularly advantageous manner and with easily manageable means.

According to a further aspect, a control and/or regulation unit of a forging machine, preferably a radial forging machine, is provided, the control or regulation unit containing a pass schedule calculation program for executing the method according to the first aspect or at least cooperating with it.

According to a third aspect, a forging machine, preferably a radial forging machine for forging stepped shafts from metal workpieces, in particular made of steel, is provided with at least 4 forging tools arranged around the circumference of the workpiece, which are set up and adapted to synchronously carry out the forging operation at least over a partial length of the workpiece and/or the stepped shaft, the forging machine according to the third aspect is connected to a control and/or regulation unit according to the second aspect or at least cooperates with it. In this way, a forging machine is made available which is able to provide the plant operator with all the technical effects associated with the method in accordance with the first aspect in a reliable and reproducible manner.

BRIEF DESCRIPTION OF THE DRAWINGS

The invention is explained in more detail below with reference to 5 figures, which show a sequence of possible forming steps for obtaining a stepped shaft from a cylindrical starting material.

FIG. 3 shows an intermediate product after a second pass.

FIG. 4 shows an intermediate product after a fourth pass.

FIG. 5 shows the end product after a fifth pass.

DETAILED DESCRIPTION

An example of how an end product in the form of a railway axle 1 is radially forged from a continuously cast cylindrical starting material 2 in a plurality of pass sequences is shown below.

Figure 1:
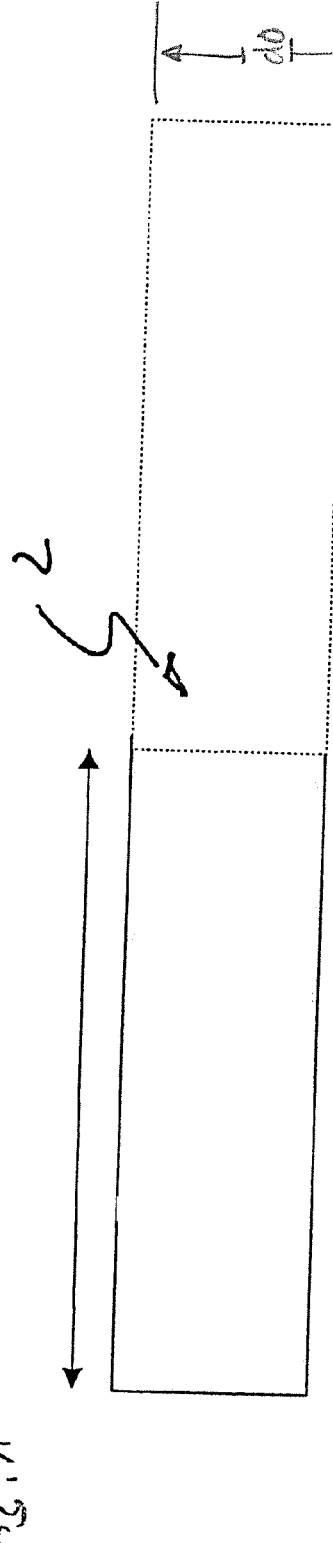
FIG. 1 shows a cross section through a starting material for carrying out the method.

FIG. 1 shows a starting material for a method according to the disclosure, here a cylindrical continuously cast billet made of carbon steel with a diameter d0.

Figure 2:
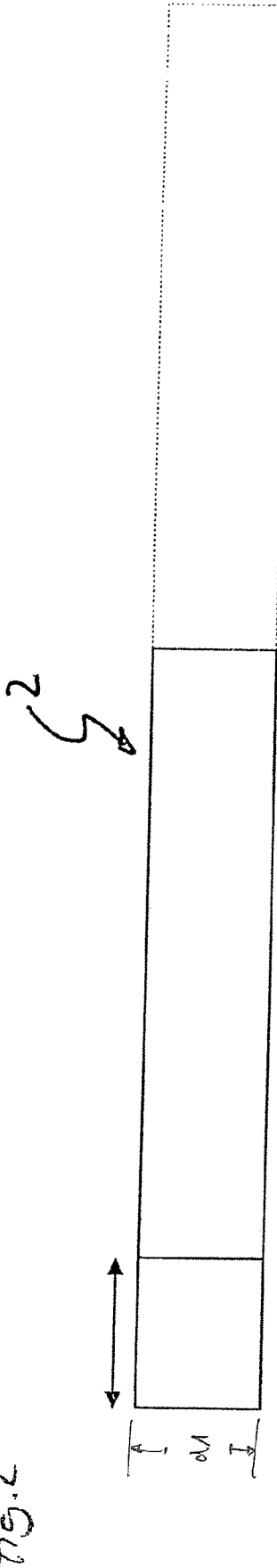
FIG. 2 shows an intermediate product after a first pass.
Figure 6:
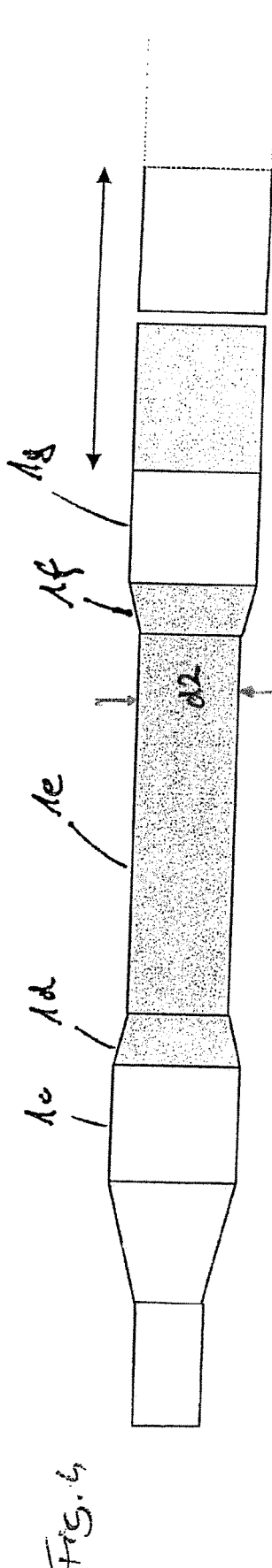

FIG. 2 shows the workpiece after a first pass, i.e., a sequence of forming operations of the radial forging machine (not shown) on the starting material 2 from FIG. 1, with the billet 2 being reduced over its entire length to a diameter d1. Thus, the length of the billet 2 has increased accordingly.

FIG. 3 shows a further intermediate stage from the billet 2 from FIG. 1 to a completely formed railway axle 1, as can be seen in FIG. 5. Viewed from left to right, the drawn out billet 2 has already been formed to its final geometry in a first journal area 1a, as well as in the transition area 1b and the cylindrical area 1c.

FIG. 4 shows a further intermediate step of the radial forging from the billet 2 to the finished forged part 1, with the forming of the central railway axis section 1e to its final diameter d2, left and right adjoining areas 1d and 1f, which form the transition from the central area 1e to the areas 1c and 1g.

Finally, FIG. 5 shows a railway axle 1 radially forged using a method according to the disclosure with its mirror-symmetrical final geometry, in which the end regions 1a and 1i have a diameter d3 and the central region 1e has the diameter d2. The entire forming process from the starting material according to FIG. 1 to the final forging according to FIG. 5 was carried out using the method for automatic pass schedule calculation and has produced a forging 1 which provides an optimized microstructure and an optimized deformation distribution for the desired application.

What is claimed is:

1. A method for forging a stepped shaft made of steel, in a forging machine with at least four forging tools arranged around a circumference of a workpiece, which are set up and adapted to simultaneously carry out a forging process over at least a partial length of the workpiece, the method comprising:

entering start parameters for the forging process into a pass schedule calculation program;

specifying target parameters for the forging process;

calculating a pass schedule or a forging sequence based on the start parameters and the target parameters by the pass schedule calculation program; and forging the stepped shaft in the forging machine by controlling the at least four forging tools in accordance with the pass schedule or forging sequence, wherein the pass schedule calculation program takes into account a tool geometry of the at least four forging tools, a maximum press force, a temperature distribution over a cross section of the stepped shaft calculated by the pass schedule calculation program, and a change in shape during forging.

2. The method according to claim 1, wherein the pass schedule calculation program takes into account an optimized deformation distribution within a predetermined temperature range in the workpiece.

3. The method according to claim 2, wherein the pass schedule calculation program takes into account the optimized deformation distribution and the temperature distribution after each pass.

4. The method according to claim 1, wherein the start parameters include at least a starting geometry of the workpiece, its dimensions, starting temperature, and material.

5. The method according to claim 1, wherein the target parameters include at least a target geometry of the stepped shaft, its final geometry and dimensions, and a deformation distribution over the cross section of the stepped shaft, and/or the temperature distribution over the cross section of the stepped shaft.

6. The method according to claim 5, wherein an optimized deformation distribution over individual steps of the forging process is calculated by the pass schedule calculation program based on the temperature distribution as one of the target parameters, or wherein the temperature distribution over the individual steps of the forging process is calculated based the deformation distribution as one of the target parameters.

7. The method according to claim 1, wherein an optimized microstructure or an optimized microstructure distribution is calculated by the pass schedule calculation program based the temperature distribution as one of the target parameters.

8. The method according to claim 1, wherein the temperature distribution is calculated using a microstructure as one of the target parameters.

9. The method according to claim 1, wherein the pass schedule calculation program takes into account heat of deformation introduced into the workpiece by deformation work during forging.

10. The method according to claim 1, wherein the pass schedule calculation program takes into account a feed rate and a material of the workpiece.

11. The method according to claim 1, wherein the pass schedule calculation program takes into account tolerances to be maintained within the stepped shaft, including tolerances to be maintained between shoulders in internally offset areas of the stepped shaft.

12. The method according to claim 1, wherein the pass schedule calculation program is connected online to a press control unit and can output optimized control commands based on measured values and/or calculated values during the forging process.

* * * * *